US009986109B2

(12) United States Patent
 Kusakabe

(10) Patent No.: US 9,986,109 B2
(45) Date of Patent: May 29, 2018

(54) INFORMATION PROCESSING APPARATUS FOR FACSIMILE TRANSMISSION, METHOD OF CONTROLLING THE SAME, AND STORAGE MEDIUM

(71) Applicant: CANON KABUSHIKI KAISHA, Tokyo (JP)

(72) Inventor: Yuki Kusakabe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 54 days.

(21) Appl. No.: 14/536,779

(22) Filed: Nov. 10, 2014

(65) Prior Publication Data

US 2015/0189102 A1 Jul. 2, 2015

(30) Foreign Application Priority Data

Dec. 27, 2013 (JP) ................................ 2013-273181

(51) Int. Cl.
 *G06F 3/12* (2006.01)
 *H04N 1/00* (2006.01)
 (Continued)

(52) U.S. Cl.
 CPC ..... *H04N 1/00244* (2013.01); *H04N 1/32037* (2013.01); *H04N 1/32117* (2013.01);
 (Continued)

(58) Field of Classification Search
 CPC ........... H04N 1/00209; H04N 1/00214; H04N 1/00281; H04N 1/00973; H04N 1/32096;
 (Continued)

(56) References Cited

U.S. PATENT DOCUMENTS

2001/0034774 A1\* 10/2001 Watanabe et al. ............ 455/419
2002/0086701 A1\* 7/2002 Salmi .............. H04M 1/274566
 379/219
(Continued)

FOREIGN PATENT DOCUMENTS

JP 2006-154891 A 6/2006

*Primary Examiner* — Benny Q Tieu
*Assistant Examiner* — Juan M Guillermety
(74) *Attorney, Agent, or Firm* — Carter, DeLuca, Farrell & Schmidt, LLP

(57) ABSTRACT

An information processing apparatus capable of instructing a facsimile transmission by controlling a device capable of transmission and receiving of a facsimile, and a method of controlling the apparatus are provided. The apparatus specifies address information indicating a transmission destination of a designated document, and determine whether or not the specified address information includes information of a communication mode. If the address information includes the information of the communication mode, in a case where a driver, that instructs the device to perform the facsimile transmission, supports the communication mode, the apparatus performs the facsimile transmission in accordance with the address information and the communication mode, and if the specified address information does not include the information of the communication mode, the apparatus performs the facsimile transmission in accordance with a communication mode that the driver supports.

19 Claims, 15 Drawing Sheets

(51) Int. Cl.
*H04N 1/32* (2006.01)
*H04N 1/333* (2006.01)

(52) U.S. Cl.
CPC . *H04N 1/33307* (2013.01); *H04N 2201/0094* (2013.01); *H04N 2201/3208* (2013.01); *H04N 2201/3223* (2013.01); *H04N 2201/3274* (2013.01)

(58) Field of Classification Search
CPC ... H04N 2201/0075; H04N 2201/0094; H04N 2201/3207–2201/3209; H04N 2201/3274; H04N 2201/3278; H04N 1/00244; H04N 1/32037; H04N 1/32117; H04N 1/33307; H04L 29/12047
USPC ..... 358/1.1, 406, 440, 468, 1.13, 1.15, 1.14; 709/217, 227, 238
See application file for complete search history.

(56) References Cited

U.S. PATENT DOCUMENTS

| | | | |
|---|---|---|---|
| 2003/0065786 A1* | 4/2003 | Park et al. | 709/227 |
| 2003/0107776 A1* | 6/2003 | Maeda | 358/402 |
| 2006/0061821 A1* | 3/2006 | Maeda | H04N 1/33307 358/1.15 |
| 2007/0086023 A1* | 4/2007 | Kadota | H04N 1/32128 358/1.13 |
| 2007/0247669 A1* | 10/2007 | Iwai et al. | 358/400 |
| 2007/0279671 A1* | 12/2007 | Shouno | G06F 3/1205 358/1.14 |
| 2008/0151318 A1* | 6/2008 | Shobu | H04N 1/32112 358/403 |
| 2009/0307316 A1* | 12/2009 | Murphy | G06Q 10/107 709/206 |
| 2011/0069356 A1* | 3/2011 | Yoshida | 358/442 |
| 2011/0102831 A1* | 5/2011 | Tanaka | H04N 1/32058 358/1.15 |
| 2011/0304891 A1* | 12/2011 | Masuda | H04N 1/00209 358/442 |
| 2012/0147436 A1* | 6/2012 | Nishiyama | 358/406 |
| 2012/0163572 A1* | 6/2012 | Yanagi | H04N 1/32797 379/100.01 |
| 2013/0301069 A1* | 11/2013 | Yanagi | G06F 3/1225 358/1.13 |

* cited by examiner

FIG. 7

| | | | | | | |
|---|---|---|---|---|---|---|
| FACSIMILE TRANSMISSION SETTINGS | | | | | | ✕ |
| DOCUMENT NAME : | JOB NAME | | | | | |
| 702 → ADDRESS BOOK : | DEVICE ADDRESS BOOK | | ∨ | | GET ADDRESSES | |
| 703 → ADDRESS LIST : | | SEARCH KEYWORD : | | SEARCH | CLEAR | |
| DESTINATION NAME | FACSIMILE NUMBER / URI | COMMUNICATION MODE | COMPANY NAME | DIVISION NAME | GROUP MEMBER : | |
| DESTINATION TARO | 123 | G3 / G4 | COMPANY AA | GENERAL AFFAIRS | | |
| DESTINATION JIRO | 456 | G3 / G4 | COMPANY BB | | | |
| DESTINATION KISABURO | 789 | G3 / G4 | | | | |
| | ⇩ ADD ~704 | | | | ADD NEW | ← 706 |
| DESTINATION NAME | FACSIMILE NUMBER / URI | COMMUNICATION MODE | COMPANY NAME | DIVISION NAME | EDIT | ← 707 |
| DESTINATION TARO | 123 | G3/G4 | COMPANY AA | GENERAL AFFAIRS | DELETE | ← 708 |
| | | | | | COVER SHEET | |
| 705 → ☐ DESIGNATE EXTERNAL LINE CONNECTION NUMBER | EXTERNAL LINE CONNECTION NUMBER : | | | | | |
| SELECT LINE (G3 / G4) : | AUTO SELECT | | | | | |
| ☑ TRANSMIT WITH ANNOTATION | | | | OK | CANCEL | |
| | | | | ↑ 709 | ↑ 710 | |

FIG. 8

```xml
<?xml version="1.0" encoding="utf-16" standalone="yes"?>
<Cabinets>
<Cabinet DisplayName="Library1" LibraryRootPath="file:///C:/Users/xxxx/Documents/MyLibrary" ProtoclolHandlerType="Local"/>
<Cabinet DisplayName="Library2" LibraryRootPath="http://100.100.21.95/sites/Library" ProtoclolHandlerType="Web"/>
</Cabinets>
```

FIG. 9

```xml
<?xml version="1.0" encoding="utf-16" standalone="yes"?>
<Property>
    <ItemProperty Name="Name" Type="System.String" DisplayName="Name" Visible="True" Searchable="True" />
    <ItemProperty Name="Title" Type="System.String" DisplayName="Title" Visible="True" Searchable="True" />
    <ItemProperty Name="Created" Type="System.DateTime" DisplayName="Date Created" Visible="True" Searchable="True" />
    <ItemProperty Name="Type" Type="System.String" DisplayName="Type" Visible="True" Searchable="True" />
    <ItemProperty Name="FileSize" Type="System.Int64" DisplayName="Size" Visible="True" Searchable="True" />
    <ItemProperty Name="Location" Type="System.String" DisplayName="Location" Visible="True" Searchable="True" />
    <ItemProperty Name="Check" Type="System.String" DisplayName="Check" Visible="True" Searchable="True" />
    <ItemProperty Name="Validation" Type="System.String" DisplayName="Validation" Visible="True" Searchable="True" />
</Property>
```

FIG. 10

| ADD NEW TRANSMISSION DESTINATION ADDRESS | ☒ |
|---|---|
| DESTINATION NAME : | [                ] ←1001 |
| COMMUNICATION MODE : | [G3 / G4    ▼] ←1002 |
| FACSIMILE NUMBER / URI : | [FACSIMILE NUMBER ▼] ←1003 |
| FACSIMILE NUMBER : | [                ] ←1004 |
| FACSIMILE NUMBER CONFIRMATION : | [                ] ←1005 |

☐ USE F CODE

F CODE : [                ]

PASSWORD : [                ]

☐ DESIGNATE ISDN SUB-ADDRESS

ISDN SUB-ADDRESS [                ]

[ OK ]   [ ADD NEXT ADDRESS ]   [ CANCEL ]
 1006                              1007

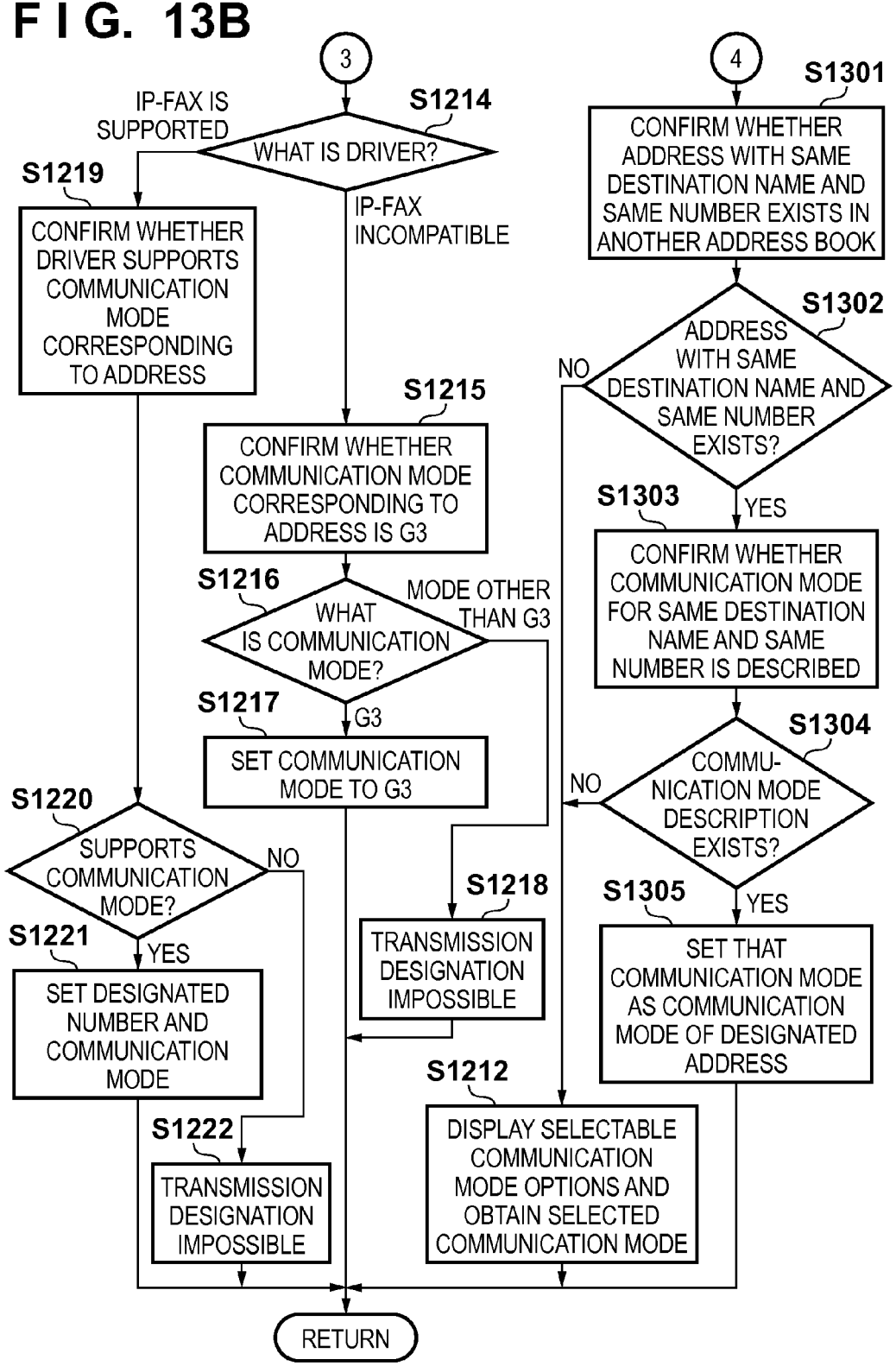

INFORMATION PROCESSING APPARATUS FOR FACSIMILE TRANSMISSION, METHOD OF CONTROLLING THE SAME, AND STORAGE MEDIUM

BACKGROUND OF THE INVENTION

Field of the Invention

The present invention relates to an information processing apparatus, a method of controlling the same and a storage medium.

Description of the Related Art

A technique for registering address information that is saved in an external database into an existing address book is disclosed in Japanese Patent Laid-Open No. 2006-154891. In Japanese Patent Laid-Open No. 2006-154891, a communication apparatus that is able to register an address of an address book saved in an external database for a particular item into an existing address book is described.

However, in recent years, image forming apparatuses capable of IP-FAX transmission have emerged, and an IP-FAX transmission has become possible in addition to a fax transmission that uses a conventional public switched telephone network. In a case where fax transmission is performed by an image forming apparatus that supports IP-FAX, a communication mode must be designated. However, in a case of a conventional image forming apparatus that only supports a public switched telephone network, it is possible to specify a partner and perform a fax transmission simply by designating a telephone number of a transmission destination. Accordingly, in a case where an image forming apparatus is instructed to perform a facsimile transmission by an information processing apparatus, cases in which the transmission cannot be performed normally arise if the transmission destination is not properly designated depending on whether the image forming apparatus supports IP-FAX or the public switched telephone network.

SUMMARY OF THE INVENTION

An aspect of the present invention is to eliminate the above-mentioned problems with conventional technology.

A feature of the present invention is to provide a technique in which a facsimile transmission, appropriate for a communication mode that a device capable of performing transmission and reception of facsimiles supports, can be instructed.

The present invention in its first aspect provides an information processing apparatus capable of instructing a facsimile transmission by controlling a device capable of transmission and receiving of a facsimile, the apparatus comprising: a driver configured to instruct the device to perform the facsimile transmission; a designation unit configured to designate a document which is a transmission target; a specifying unit configured to specify address information indicating a transmission destination of the document designated by the designation unit; a determination unit configured to determine whether or not the address information specified by the specifying unit includes information of a communication mode; and a control unit configured to control: (i) in a case where, if the determination unit determines that the information of the communication mode is included, the driver supports the communication mode, to perform the facsimile transmission in accordance with the address information and the communication mode, and (ii) if the determination unit determines that the information of the communication mode is not included, to perform the facsimile transmission in accordance with a communication mode that the driver supports.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 depicts a view illustrating an example of a facsimile transmission settings dialog for setting address information and other information necessary for fax transmission when performing a fax transmission using an image forming apparatus in the information processing apparatus according to the first embodiment.

FIG. 8 depicts a view illustrating an example of library registration information according to the first embodiment.

FIG. 9 depicts a view illustrating an example of property information established for a library in the first embodiment.

FIG. 10 depicts a view illustrating an example of a new addition dialog displayed on a display unit of the information processing apparatus when a new addition button is pressed.

FIGS. 13A and 13B are flowcharts for explaining details of the address designation processing of step S1103 of FIG. 11 according to a second embodiment of the present invention.

DESCRIPTION OF THE EMBODIMENTS

Embodiments of the present invention will now be described hereinafter in detail, with reference to the accompanying drawings. It is to be understood that the following embodiments is not intended to limit the claims of the present invention, and that not all of the combinations of the aspects that are described according to the following embodiments are necessarily required with respect to the means to solve the problems according to the present invention.

Figure 1:
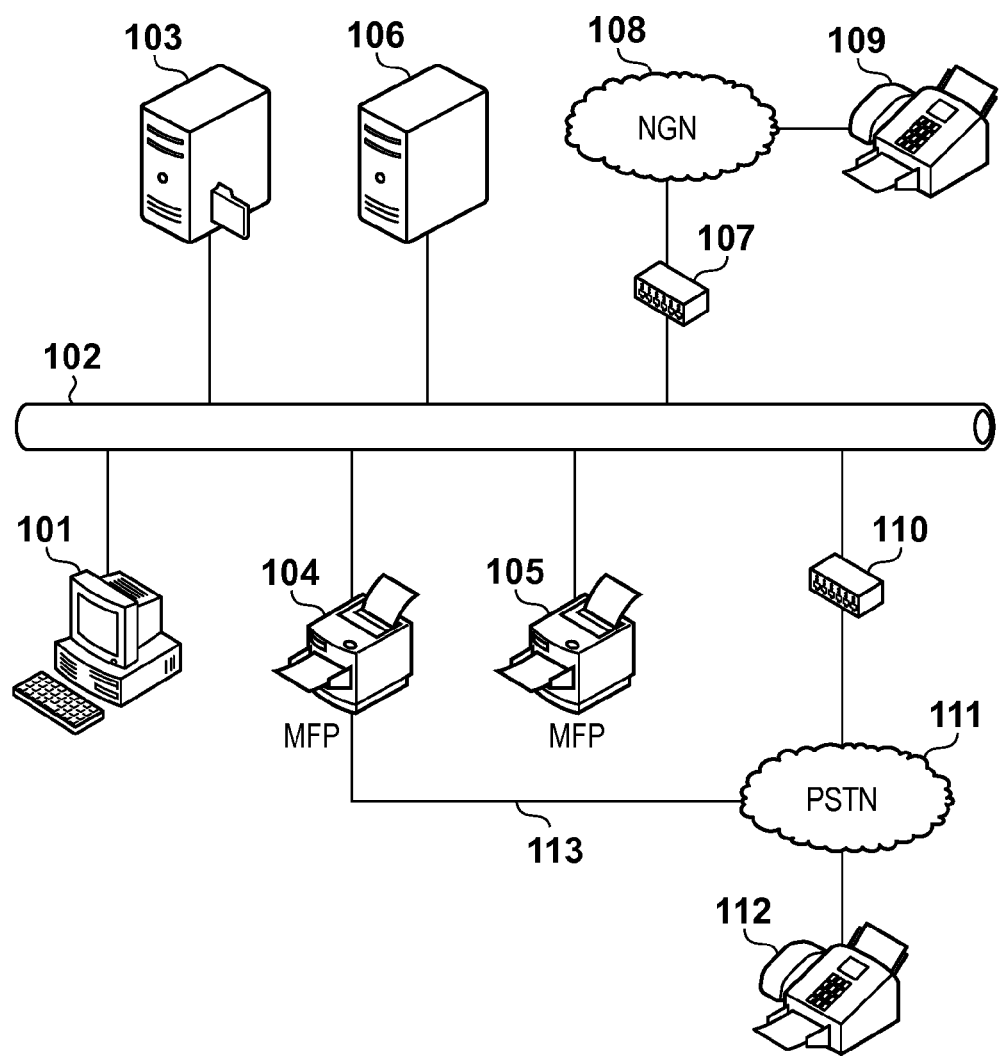
FIG. 1 depicts a view for showing an overall configuration of a communications system according to a first embodiment of the present invention.

FIG. 1 depicts a view for showing an overall configuration of a communications system according to a first embodiment of the present invention.

In FIG. 1, an information processing apparatus 101 is connected, via a network 102, to a document management server 103, image forming apparatuses 104 and 105, and an SIP server 106. A home gateway 107 is a gateway that connects the network 102 and an NGN (Next Generation Network) 108, and the image forming apparatuses (MFP) 104 and 105 are able to perform transmission and receiving of facsimiles with a facsimile device 109 via the NGN 108. A VoIP (Voice over Internet Protocol) gateway (hereinafter, VoIP gateway) 110 connects a public switched telephone network (PSTN) 111 and the network 102. The VoIP gateway 110 converts between analog audio data and digital IP packet. For example, a fax transmission is performed towards a facsimile device 112 via the public switched telephone network 111 via the VoIP gateway 110 from the image forming apparatus 104. Also, it is possible to perform a fax transmission to the facsimile device 112 directly via the public switched telephone network 111 by using a telephone line 113. A merit of using the public switched telephone network 111 temporarily through the VoIP gateway 110 is that communication costs are reduced.

Figure 2:
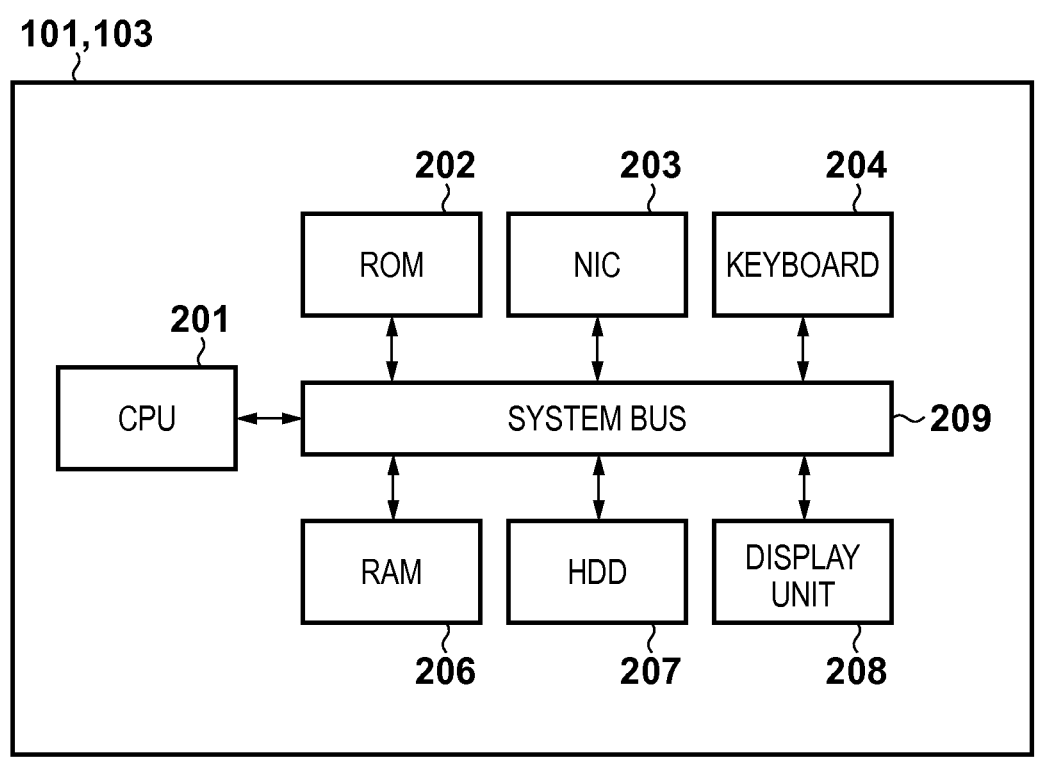
FIG. 2 is a block diagram for explaining a hardware configuration of an information processing apparatus and a document management server according to the first embodiment.

FIG. 2 is a block diagram for explaining a hardware configuration of the information processing apparatus 101 and the document management server 103 according to the first embodiment. Note that the document management server 103 is an apparatus connectable to the information processing apparatus 101 and that the document management server 103 may be a generic personal computer.

A CPU 201 is a central arithmetic processing device responsible for overall control of the information processing apparatus 101. The CPU 201 reads out application programs, an operating system (OS), a document management application, or the like, which are stored in an HDD 207, deploys them into a RAM 206, and executes them. A ROM 202 is a read-only memory which stores programs such as a basic I/O program and various data such as font data used when performing file processing. An NIC 203 is a network interface, and the information processing apparatus 101 performs an exchange of data with external apparatuses on the network 102 via the NIC 203 and the network 102. A keyboard 204 is used for a user to input control commands and text. The RAM 206 is used as a main memory and a work area of the CPU 201. The HDD 207 is a hard disk drive which stores application programs, the OS, various programs, and the like. A display unit 208 is used for displaying commands input from the keyboard 204 and statuses of a document management application and the like according to embodiments. A system bus 209 is a bus for connecting each unit of the information processing apparatus 101 and the CPU 201, and the system bus 209 transmits control signals and data.

Note that the hardware configuration of the document management server 103 is the same as that of FIG. 2, and so explanation will be omitted.

Figure 3:
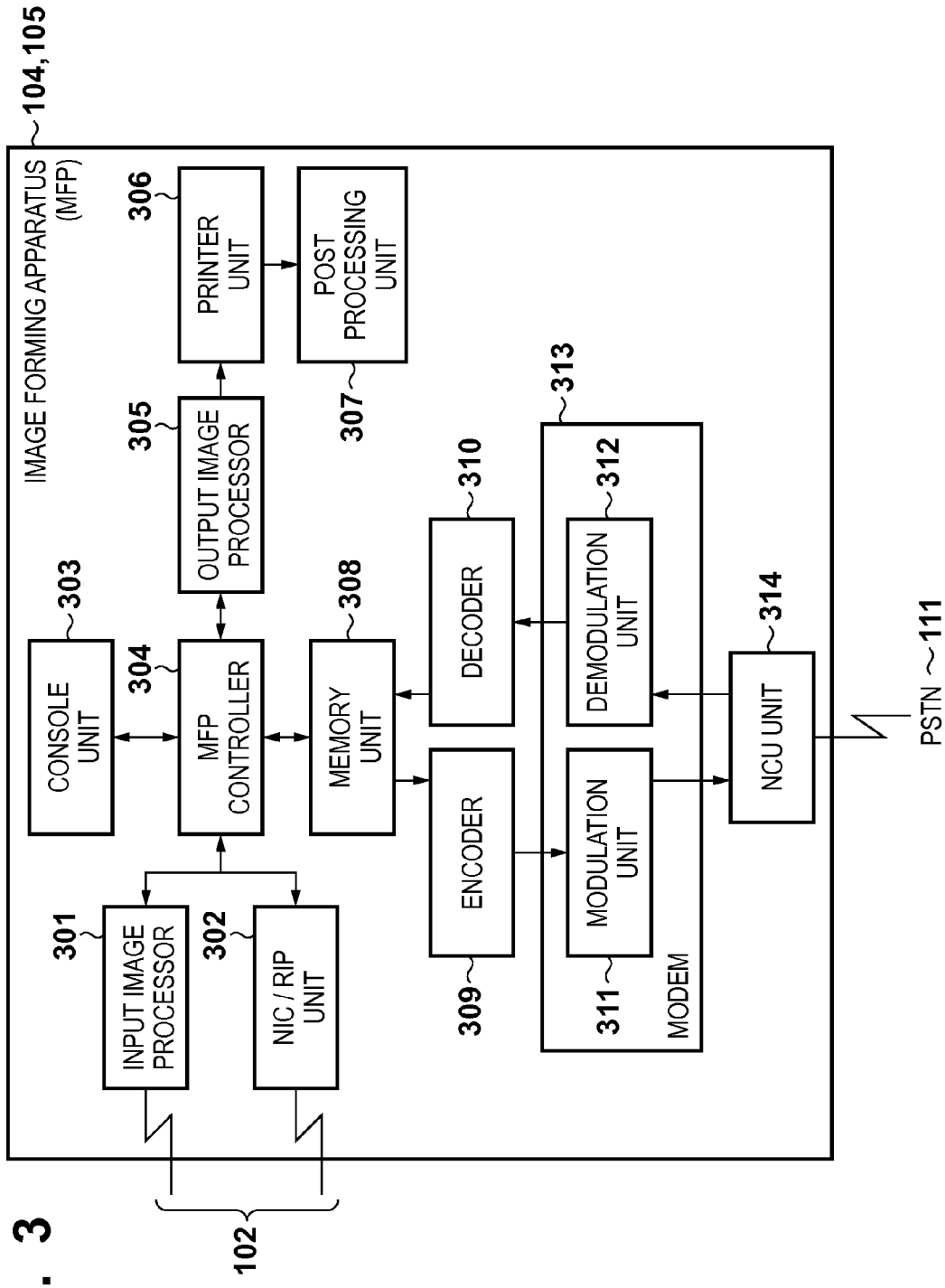
FIG. 3 is a block diagram for explaining a hardware configuration of an image forming apparatus according to the first embodiment.

FIG. 3 is a block diagram for explaining a hardware configuration of the image forming apparatus 104 (105) according to the first embodiment. Note that the image forming apparatuses 104 and 105 are explained as examples of multi function peripherals (MFP) equipped with a scanner function, a data saving function (box function), and a facsimile sending/receiving function in addition to a printing function.

An input image processor 301 performs image processing by inputting image data generated by a scanner reading an original. An NIC/RIP unit 302 passes image data received via the network 102 (mainly PDL data) to a RIP unit, and transmits image data and device information via the network 102 to an external unit. The NIC/RIP unit 302 analyzes input PDL (page description language) data and expands the data into image data. A console unit 303 has a display unit and a key pad, and displays previews of image data and an operation screen, and also accepts operations made by a user. Image data input via the scanner or the network 102 is transmitted to an MFP controller 304. The MFP controller 304 performs the role of traffic arrangement to control inputted data and outputted data. Also, image data input into the MFP controller 304 is stored first in a memory unit 308. An output image processor 305 applies image processing for printing to image data read out from the memory unit 308, and outputs to a printer unit 306. The printer unit 306 prints an image on a fed sheet based on image data received from the output image processor 305. A sheet onto which an image is thus printed is sent to a post processing unit 307, and finishing processing such as sheet assortment processing, stapling, and book binding are performed.

Upon facsimile transmission, image data of a read in original is transmitted to a partner device via the public switched telephone network 111. For this reason, after the image data stored in the memory unit 308 by the MFP controller 304 is compressed by an encoder 309 (commonly a run length approach is used for compression/decompression in facsimiles), the result is converted from a digital signal to an analog signal by a modulation unit 311. This conversion is called a modulation, and signals thus modulated are transmitted to the public switched telephone network 111 via an NCU unit 314. Also, upon reception of a facsimile, a demodulation unit 312 converts an analog signal received via the public switched telephone network 111 into a digital signal. In other words, a signal received from the public switched telephone network 111 is received by the NCU unit 314, voltage converted, and after being demodulated by the demodulation unit 312, compressed data (run length, or the like) is converted into raster data by a decoder 310. The image data thus converted into raster data is temporarily stored in the memory unit 308, and after it is confirmed that there is no image data transfer error, the data is sent to the MFP controller 304. A modem 313 comprises the modulation unit 311 and the demodulation unit 312.

Figure 4:
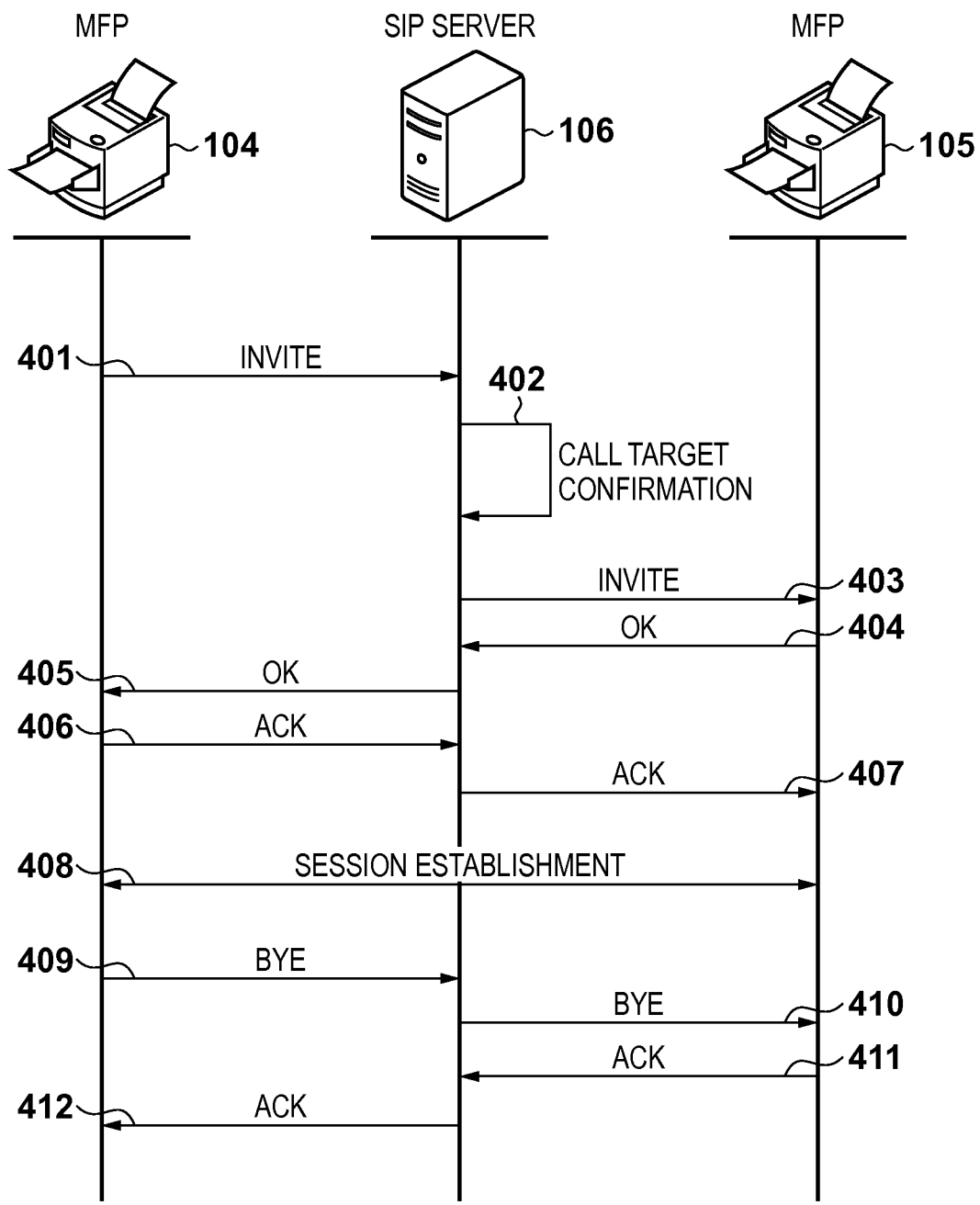
FIG. 4 depicts a view for explaining and example of a sequence for a case in which image forming apparatuses communicate with each other via a SIP server according to the first embodiment.

FIG. 4 depicts a view for explaining an example of a sequence in a case where the image forming apparatuses 104 and 105 communicate via the SIP server 106 according to the first embodiment.

The image forming apparatus 104, which is a transmission source, transmits an INVITE request 401 to the SIP server 106. At reference numeral 402, the SIP server 106 confirms the IP address of the call target from the number of the INVITE request 401, and transmits an INVITE request 403 to the image forming apparatus 105, which is a transmission destination. With this, when the image forming apparatus 105 receives the INVITE request 403, the image forming apparatus 105 returns an OK response 404 to the SIP server 106. The SIP server 106 returns an OK response 405 to the image forming apparatus 104, which is the transmission source, in accordance with the OK response 404. In response to this, the image forming apparatus 104, which is the transmission source, transmits an ACK 406 to the SIP server 106. With this, the SIP server 106 transmits an ACK 407 to the image forming apparatus 105, which is the transmission destination. With this, at reference numeral 408, a session between the image forming apparatus 104, which is the transmission source, and the image forming apparatus 105, which is the transmission destination, is established, and transmission and reception of facsimiles becomes possible between the image forming apparatuses 104 and 105. Then, when the facsimile transmission from the image forming apparatus 104 to the image forming apparatus 105 completes, the image forming apparatus 104 transmits a BYE 409 indicating a session termination to the SIP server 106. With this, the SIP server 106 transmits a BYE 410 to the image forming apparatus 105, which is the transmission destination. In response to the BYE 410, the image forming apparatus 105 returns an acknowledgement response to the SIP server 106 with an ACK 411. In this way, when an ACK 412 is transmitted to the image forming apparatus 104, which is the transmission source, from the SIP server 106, the sequence of the session ends, and the facsimile transmission by the image forming apparatuses 104 and 105 completes.

Figure 5:
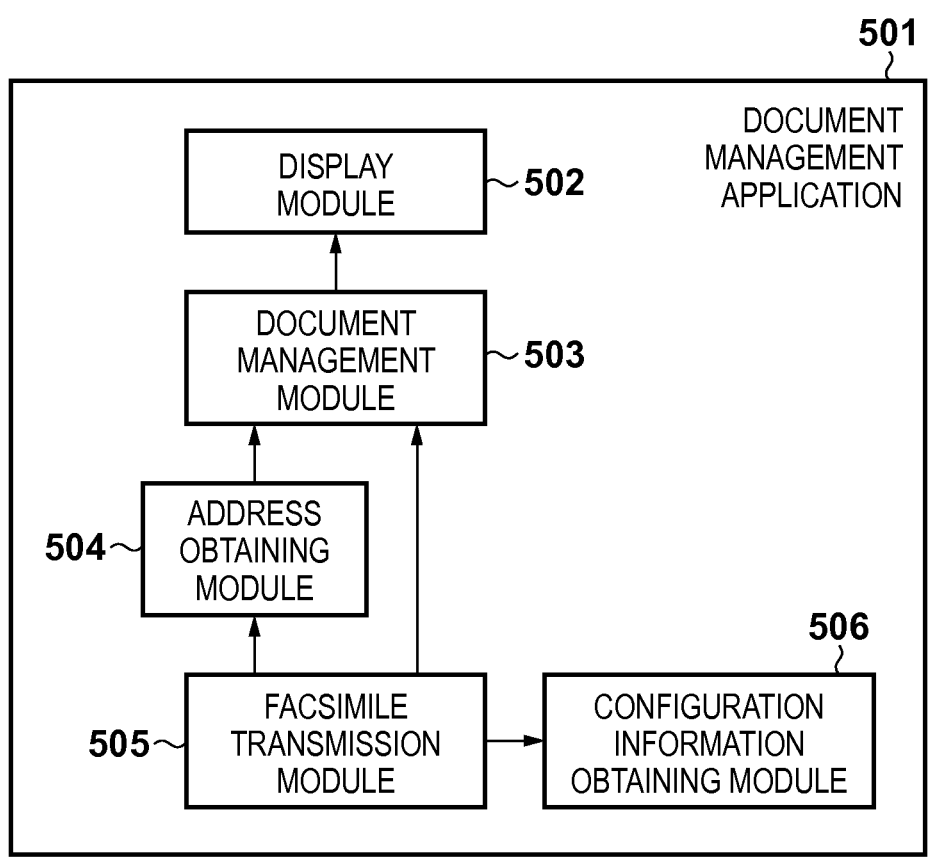
FIG. 5 is a functional configuration diagram of a document management application executed on one of the information processing apparatuses according to the first embodiment.

FIG. 5 is a functional configuration diagram of a document management application executed on the information processing apparatus 101 according to the first embodiment.

The document management application 501 is executed on the information processing apparatus 101, and deployed to the RAM 206 upon execution, and executed by the CPU 201. The document management application 501 references document data of the document management server 103, and executes operations on the document data. A document management module 503 manages the referenced document management server 103. A display module 502 receives an input from the keyboard 204, and displays results processed by the document management application 501 on the display unit 208. An address obtaining module 504 obtains, as an address, a file attribute stored in the document management server 103, and obtains an address book (file) or an address from the image forming apparatuses 104 and 105. A facsimile transmission module 505 activates a facsimile driver installed in the information processing apparatus 101, and is able to execute a fax transmission using the image forming apparatus 104 (105). A configuration information obtaining module 506 obtains configuration information of the image forming apparatus 104 (105) using a device driver, and can determine whether or not the image forming apparatus 104 (105) is able to use the public switched telephone network 111 and whether or not the image forming apparatus 104 (105) is able to use IP-FAX.

Figure 6:
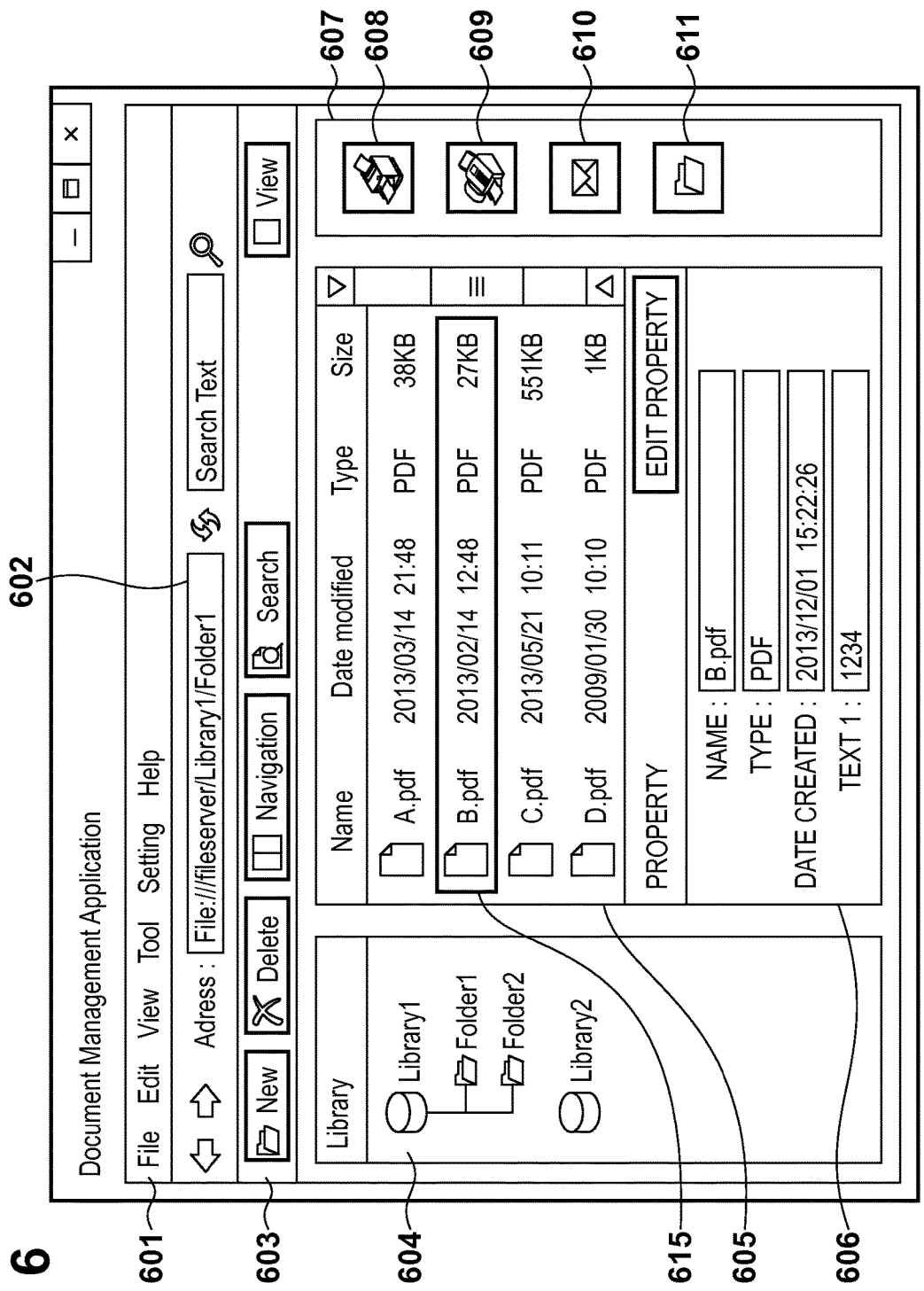
FIG. 6 depicts a view illustrating an example of a UI for when the document management application is executed on the information processing apparatus according to the first embodiment.

FIG. 6 depicts a view illustrating an example of a UI for when the document management application 501 is executed on the information processing apparatus 101 according to the first embodiment.

A menu 601 displays a list of execution commands of operations corresponding to a folder or a document file, and shows a menu screen enabling the execution of the commands. An address bar 602 displays a path of a folder currently referenced. Here, by inputting a path of a folder into the address bar 602 directly, document files included in the folder of the designated path are displayed in a list on a file list view 605. A shortcut button corresponding to the operation executable in the menu 601 is displayed on a toolbar 603. The switching of the display of the file list view 605 is performed by making an instruction on the button of the toolbar 603. A navigation pane 604 displays a list of registered libraries and the location of the folder currently referenced. A plurality of the libraries can be registered, and properties that are displayable or functions that are operable differ depending on the registered library. This may be determined by the document management application 501, and it may also be determined by the document management server 103. Note that the relationship between the library and the folder is that the library is an upper hierarchy, and a hierarchical structure of the folder exists under the hierarchical structure of the library. Also, the content set for the library is applied to the folder as well.

FIG. 8 depicts a view illustrating an example of library registration information according to the first embodiment.

In FIG. 8, a definition of the library registration information is in XML, but it is not limited to XML as long as the document management application 501 can interpret the information. Here, a display name of the registered library is described as "DisplayName", the path indicating the save destination is described as "LibraryRootPath", and the type of the save destination is described as "ProtocolHandlerType".

The file list view 605 displays a list of folders and document files included in the folder path displayed on the address bar 602. A display approach changes according to a switching of the display which is designated by the toolbar 603. An example of list display is described in the present example.

A properties pane 606 displays properties of a folder or a file selected in the file list view 605. Here, the properties of a file 615 (B.pdf) are displayed. Editable property exists in the properties, and the number of a partner related to the file can be inputted in the properties. Also, the properties can be determined in units of a library.

FIG. 9 depicts a view illustrating an example of property information established for a library in the first embodiment.

Here, an example of a definition of property attribute established in a library is shown. An item name is described as "Name", an attribute type is described as "Type", a display name of an attribute is described as "DisplayName", an enabling/disabling of display is described as "Visible", and an enabling/disabling of searching is described as "Searchable". The item name is a name to uniquely distinguish an attribute. The type of the attribute defines what kind of type the item value is used as. A string data type (System.String), a date/time type (System.DateTime), a numeric type (System.Int64), or the like, exist as types, and a displayed UI or a search condition differ in accordance with the type. The display name of an attribute is the item name displayed on UI, and here, a name, a title, a date created, a type, a size, a location, a check, a validation, or the like, are included. The name displayed on the properties pane 606 is also the item name. The enabling/disabling of displaying defines whether or not the property is displayed on the properties pane 606. The property is not displayed on the properties pane 606 in a case of being undisplayable (Visible=False). The enabling/disabling of searching defines whether or not the attribute can be searched. The property is not displayed in a search condition in a case of being unsearchable (Searchable=False). Attribute information which is displayable as a search condition but that is not displayed on the properties pane 606 can also exist.

By pressing a button registered in an output bar 607, an action associated with the button can be executed on a document file selected in the file list view 605. A print button 608, a facsimile transmission button 609, an attachment button 610, and an action button 611 which cause a movement to a folder are registered on the output bar 607 in the first embodiment.

With the document management application 501, it is possible to designate such that a property appended to document files in units of a library is input as the number upon a fax transmission. With this, when a fax transmission is performed having selected a document file from a designated library, it is possible to add the number that is appended to the properties of the document file to the destination and the facsimile number/URI.

FIG. 7 depicts a view illustrating an example of a facsimile transmission settings dialog, for setting address information and other information necessary for a fax transmission upon a fax transmission using the image forming apparatus 104, in the information processing apparatus 101 according to the first embodiment.

The facsimile transmission settings dialog is an example of a UI for setting an address of a partner for when performing a fax transmission using the image forming apparatus 104. An address book selection box 702 is a control for designating an address book used when performing the fax transmission. By selecting the address book with the address book selection box 702, it is possible to designate an address saved in an address book of the image forming apparatus 104 (105), an address book of a facsimile driver, or an address file (an Excel file or a csv file). In the example of FIG. 7, "device address book", i.e. the address book of the image forming apparatus 104, is selected. An address list 703 displays a list of addresses described in the address book designated by the address book selection box 702, and a user can select an address of a transmission destination from the list. A user presses an addition button 704, having selected an address to which the user wishes to transmit from the address list 703. With this, the address of the transmission destination to which to perform the fax transmission is added and displayed to a destination list 705. A new addition button 706 is a button for newly adding an address to the destination list 705 rather than from the address book selected in the address book selection box 702.

FIG. 10 depicts a view illustrating an example of a new addition dialog displayed on the display unit 208 when the new addition button 706 is pressed.

A destination name box 1001 is a text box for inputting a name of a destination. The destination name is used as identification information printed to a cover sheet so that the destination can be recognized. A communication mode selection box 1002 is a combo box for selecting a communication mode by which to transmit. The communication mode selection box 1002 displays a list of communication modes that the transmitting image forming apparatus (the image forming apparatus 104, here) is capable of transmitting. Here, as communication modes, there are G3/G4, NGN, intranet, VoIP gateway, or the like. A facsimile number/URI box 1003 is a combo box for designating, when intranet is selected with the communication mode selection box 1002, whether the data input into a facsimile number box 1004 is a facsimile number or a URI. The facsimile number box 1004 is a text box for inputting an address upon transmission. A facsimile number confirmation box 1005 is a text box for once again inputting the same value such that there is no mistake in the value inputted into the facsimile number box 1004. In a case where the values inputted into the facsimile number box 1004 and the facsimile number confirmation box 1005 do not match, the values are not registered as the address of the transmission destination. When an OK button 1006 is pressed, information such as the destination, the communication mode, and the facsimile number inputted by this new addition dialog are displayed in the destination list 705 as a transmission destination address, and the dialog is closed. When a cancel button 1007 is pressed, the information inputted into this new addition dialog is discarded, and the dialog is closed.

Once again returning to FIG. 7, when an edit button 707 is pressed in a state in which a transmission destination displayed in the destination list 705 is selected, it is possible to edit the information of the selected transmission destination. In other words, when a user presses the edit button 707 having selected an address of a transmission destination from the destination list 705, display is performed to the new addition dialog shown in FIG. 10 in a state in which the destination address information and the facsimile number, or the like, which are previously registered, are added. Here, the user is able to register an editing result in addition to being able to display the editing result to the destination list 705 by editing the information that the user wishes to edit on the new transmission destination address addition dialog and by pressing the OK button 1006.

Also, the user is able to delete an address of a transmission destination that the user wishes to delete by selecting the address in the destination list 705 and pressing a delete button 708. An OK button 709 is an execution button for making an instruction for execution of a fax transmission to a transmission destination set with the facsimile transmission settings dialog of FIG. 7. In other words, a user is able to instruct that a fax transmission be performed to the address displayed in the destination list 705. A cancel button 710 is a button for cancelling a fax transmission to the transmission destination set in the facsimile transmission settings dialog. When the cancel button 710 is pressed, the facsimile transmission settings dialog is terminated without executing the fax transmission processing.

Next, explanation will be given, with reference to the flowcharts of FIG. 11 and FIGS. 12A and 12B, of an example in which the document management application 501 of the information processing apparatus 101, upon fax transmission, according to the first embodiment makes an instruction for a fax transmission to the image forming apparatus 104 which supports IP-FAX. Note that each step of this flowchart is realized by a program relating to the flowchart being read out into the RAM 206, and executed by the CPU 201.

Figure 11:
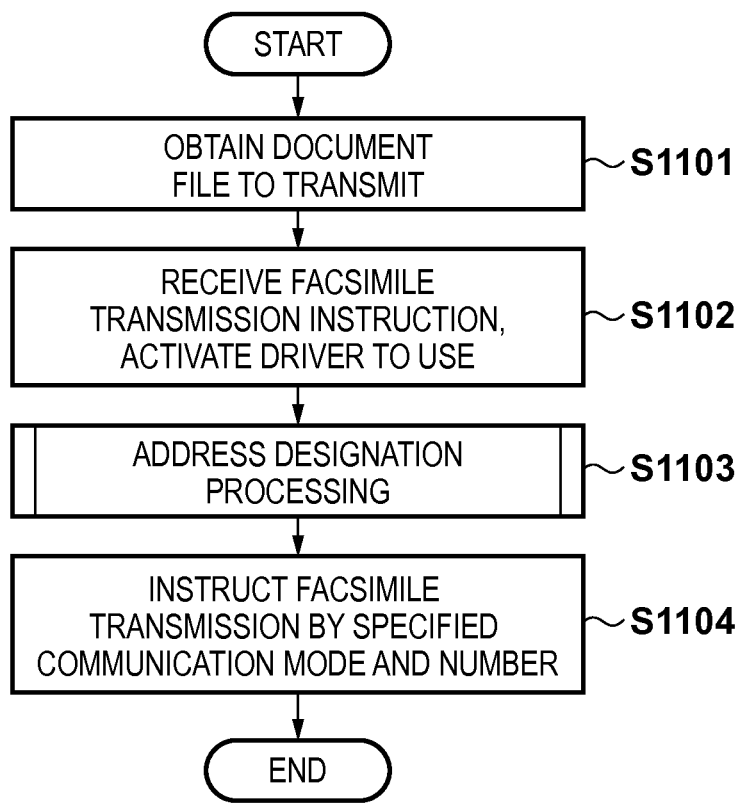
FIG. 11 is a flowchart for describing processing for the information processing apparatus performing a facsimile transmission using the image forming apparatus according to the first embodiment.

FIG. 11 is a flowchart for describing processing for the information processing apparatus 101 performing a facsimile transmission using the image forming apparatus 104 according to the first embodiment.

Firstly, in step S1101, the CPU 201 displays, on the display unit 208, a screen including the file list view 605 of FIG. 6, and obtains a folder or a file that a user selects via the screen. Here, in a case where the user selects a folder, a list of files immediately below the folder is the target of the fax transmission. On the other hand, when the user selects a file, the file is the target of the fax transmission. Next, the processing proceeds to step S1102, and the CPU 201 receives a fax transmission instruction from the user. Here, the user drags and drops the folder or file selected in step S1101 into the facsimile button 609 of the output bar 607. Alternatively, by pressing the facsimile button 609 in a state in which a folder or a file is selected, fax transmission of the selected folder or file is instructed. With this, the CPU 201, in step S1102, activates a facsimile driver for fax transmission. Next, the processing proceeds to step S1103 and the CPU 201 obtains the address of the transmission destination designated via the facsimile transmission settings dialog of FIG. 7. Next, the processing proceeds to step S1104, and the CPU 201 makes an instruction for a fax transmission to the image forming apparatus 104 in accordance with the designated address of the transmission destination and the communication mode upon the OK button 709 being pressed on the screen of FIG. 7, for example.

Figure 12A:
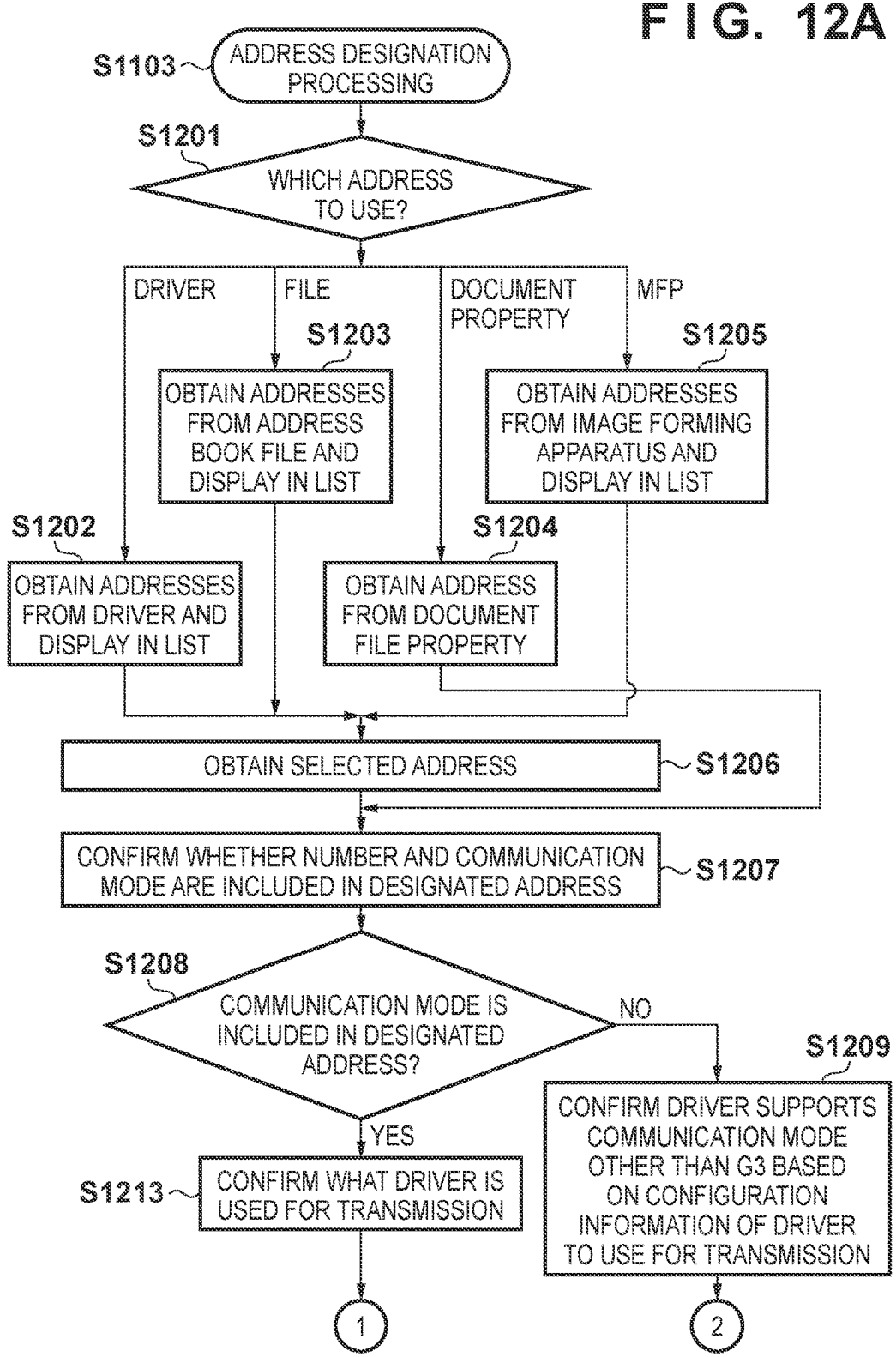
FIGS. 12A and 12B are flowcharts for explaining details of address designation processing of step S1103 of FIG. 11.
Figure 12B:
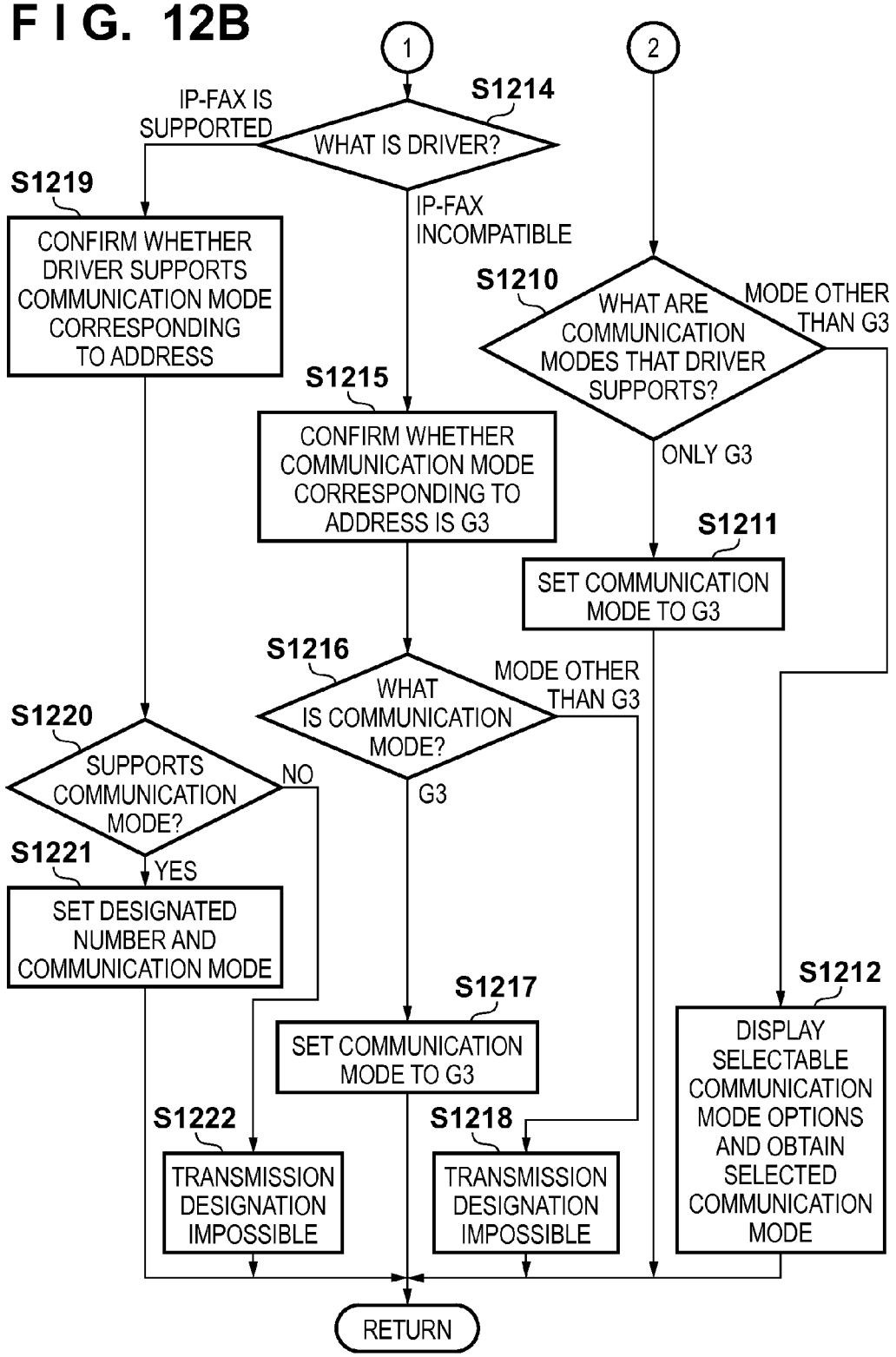

FIGS. 12A and 12B are flowcharts for explaining details of address designation processing of step S1103 of FIG. 11.

Firstly, in step S1201, the CPU 201 determines which address to use. Here, in a case where the document file or folder designated for the fax transmission is included in a library for which a telephone number is designated, the processing proceeds to step S1204, the telephone number is obtained from the designated property in the document file or folder, and the processing proceeds to step S1207. Also, in a case where the user designated an address book of the driver in the address book selection box 702 of the facsimile transmission settings dialog of FIG. 7, the processing proceeds to step S1202 from step S1201, the addresses stored in the address book of the driver are displayed in the address list 703, and the processing proceeds to step S1206. Also, in a case where the user selected address book file in the address book selection box 702 of the facsimile transmission settings dialog of FIG. 7, the processing proceeds to step S1203 from step S1201, the address information is read in from the selected address book and displayed on the address list 703, and the processing proceeds to step S1206. Furthermore, in a case where the user designates an address book of the image forming apparatus 104 in the address book selection box 702 of the facsimile transmission settings dialog of FIG. 7, the processing proceeds to step S1205 from step S1201, the addresses are obtained from the address book of the image forming apparatus 104 and displayed on the address list 703, and the processing proceeds to step S1206.

In step S1206, when the user selects the address of the transmission destination from the address list 703 of the facsimile transmission settings dialog and presses the addition button 704, the CPU 201 obtains and specifies the address of the selected transmission destination. Next, the processing proceeds to step S1207, and the CPU 201 confirms whether or not the destination number and a communication mode are included in the obtained address. When, in step S1208, the CPU 201 determines that the communication mode is not included in the address, the processing proceeds to step S1209, and the CPU 201, based on configuration information of the designated driver, investigates whether or not the driver supports a communication mode other than G3. Then, if, in step S1210 (FIG. 12B), the CPU 201 determines that the driver supports a communication mode other than G3, the processing proceeds to step S1212, and options for which of the selectable communication modes to use are displayed on the display unit 208. Configuration may be taken such that the display of the options in this case re-uses the new transmission destination address addition dialog of FIG. 10, and in a state in which the number of the transmission destination is displayed in the facsimile number box 1004, the user is allowed to select the communication mode from the communication mode selection box 1002. When the communication mode options are displayed, and the user selects a desired communication mode from out of the displayed options, the selected communication mode is set, and the processing completes. Meanwhile, in a case where it is determined, in step S1210, that the driver only supports the G3 communication mode, the processing proceeds to step S1211, the CPU 201 sets the communication mode to G3, and the processing completes.

Meanwhile, when, in step S1208, it is determined that a communication mode is included in the address, the processing proceeds to step S1213, and the CPU 201 determines what the designated driver is. Then, the processing proceeds to step S1214 (FIG. 12B), and if the CPU 201 determines that the driver is an IP-FAX incompatible driver, the processing proceeds to step S1215, and it is confirmed whether or not the communication mode designated corresponding to the transmission destination address is G3. Then, the processing proceeds to step S1216, and the CPU 201 determines whether or not the communication mode corresponding to the address is G3, and if the communication mode is G3, the processing proceeds to step S1217, the CPU 201 determines the communication mode to be G3, and the processing completes. Meanwhile, if, in step S1216, the communication mode is determined to be other than G3, the processing proceeds to step S1218, and the CPU 201 determines that the fax transmission cannot be performed since the driver is IP-FAX incompatible, notification is made that transmission is impossible, and the processing completes. Note that for the notification approach in such a case, configuration may be taken such that an error message is displayed on the display unit 208, or such that the addition button 704 cannot be pressed in the facsimile transmission settings dialog of FIG. 7.

Also, in a case where, in step S1214, the CPU 201 determines that the driver is a driver that supports IP-FAX, the processing proceeds to step S1219, and the CPU 201 confirms the configuration information of the driver in order to investigate whether or not the driver supports the communication mode corresponding to the address. Then, the processing proceeds to step S1220, and if the CPU 201 determines that the communication mode corresponding to the address is not supported, the processing proceeds to step S1222, and notification is made that, because the fax transmission cannot be performed, the transmission is impossible, and the processing completes. Meanwhile, when, in step S1220, it is determined that the communication mode corresponding to the address is supported, the processing proceeds to step S1221, the CPU 201 adds the selected address information to the destination list 705, and the processing completes.

By the first embodiment, as explained above, it is possible to perform a fax transmission by a communication mode corresponding to a designated address using an image forming apparatus that can support a public switched telephone network and IP-FAX.

Second Embodiment

Next, explanation will be given for a second embodiment of the present invention. When designating an address of a transmission destination and transmitting, there are cases in which the communication mode is not described for the address of the transmission destination in the selected address book, and the communication mode of the address is described in another address book. In the first embodiment described above, a plurality of address books are used, but information indicating their respective relevance is not stored. For this reason, in a case where there is no description of the communication mode for the address in the selected address book, and communication modes other than G3 are included in the configuration information of the driver, processing for selecting the communication mode is necessary as in the previously described first embodiment.

In contrast to this, explanation will be given, in the second embodiment for an example in which the communication mode of an address of a transmission destination is obtained from another address book using information indicating relevance of a plurality of address books. Note that the configurations of the information processing apparatus 101, the document management server 103, the image forming apparatuses 104 and 105, and the SIP server 106, and the system configuration according to the second embodiment are the same as those of the previously described first embodiment, and so their explanation will be omitted.

Figure 13A:
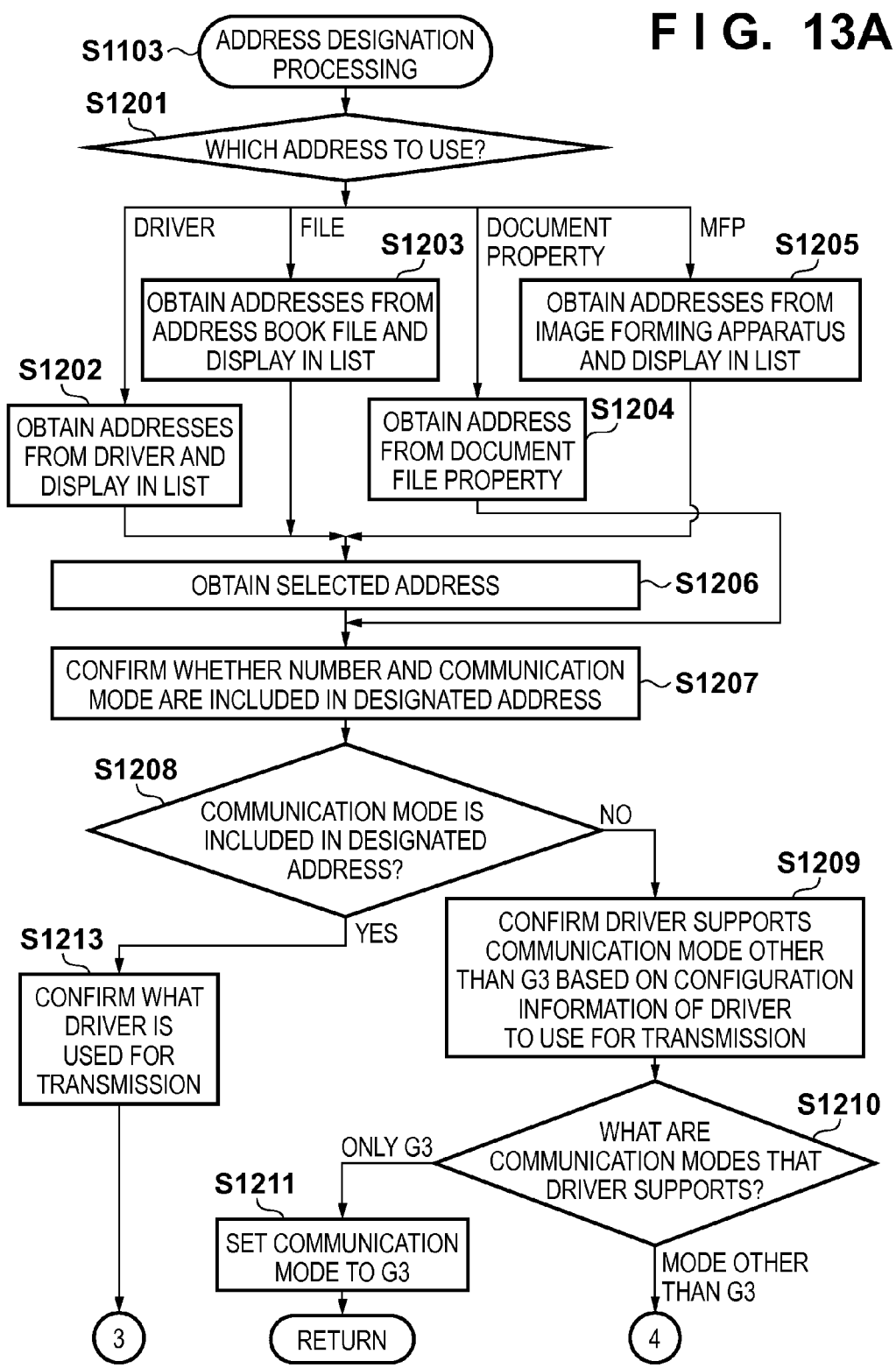

FIGS. 13A and 13B are flowcharts for explaining details of the address designation processing of step S1103 of FIG. 11 according to the second embodiment of the present invention. Note that each step of this flowchart is realized by a program relating to the flowchart being read out into the RAM 206, and executed by the CPU 201. Furthermore, in FIGS. 13A and 13B, steps that execute the same processing as steps of the previously described FIGS. 12A and 12B are shown with the same reference numerals, and their explanation will be omitted.

When, in step S1210, the CPU 201 determines that a communication mode other than G3 is included in the communication modes that the driver supports, the processing proceeds to step S1301 (FIG. 13B). In step S1301, the CPU 201 confirms whether an address with the same destination name and the same number exists in an address book other than the currently selected address book. Then, in step S1302, if the CPU 201 determines that the same destination name and the same number do not exist in another address book, the processing proceeds to step S1212, and as previously explained, the CPU 201 displays options for which of the selectable communication modes to use. Then, the communication mode selected by the user from out of the displayed options is obtained, and the processing completes.

Meanwhile, if, in step S1302, it is determined that the same destination name and the same number exists in another address book, the processing proceeds to step S1303, and it is confirmed whether a communication mode, for the same destination name and the same number that were found in the another address book, is described. Then, when, in step S1304, the CPU 201 determines whether or not the communication mode is described, and determines that the communication mode is not described, the processing proceeds to step S1212, and the processing completes. On the other hand, in a case where it is determined, in step S1304, that the communication mode is described, the processing proceeds to step S1305, and CPU 201 sets the communication mode of the designated address to the communication mode described in the address book, and the processing completes.

By the second embodiment, as explained above, information indicating relevance of a plurality of address books is referenced, and information that is insufficient in one address book can be supplemented by information in another address book. With this, for example, there is the effect that a communication mode of an address that is not designated in an address book can be obtained from another address book and set.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-273181, filed Dec. 27, 2013, which is hereby incorporated by reference herein in its entirety.

What is claimed is:

1. An information processing apparatus capable of instructing a facsimile transmission by controlling a device capable of transmission of a facsimile, the information processing apparatus comprising:
 a processor coupled to a memory and configured to function as:
  a designation unit configured to designate a document which is a transmission target;
  a specifying unit configured to specify destination information related to a transmission destination of the document designated by the designation unit;
  a first determination unit configured to determine whether or not a communication mode is designated in the destination information specified by the specifying unit;
  a second determination unit configured to determine whether or not a driver for causing the device to perform a facsimile transmission supports the communication mode; and
  a control unit configured to:
   (i) in a case where the first determination unit determines that the communication mode is designated in the destination information and the second determination unit determines that the driver supports the designated communication mode, cause the facsimile transmission to be performed in accordance with the designated communication mode,
   (ii) in a case where the first determination unit determines that the communication mode is not designated in the destination information and the second determination unit determines that the driver supports a communication mode other than G3, display a screen via which a user selects a communication mode for performing the facsimile transmission, and
   (iii) in a case where the first determination unit determines that the communication mode is not designated in the destination information and the second determination unit determines that the driver only supports G3, cause the facsimile transmission to be performed by G3.

2. The information processing apparatus according to claim 1, wherein the specifying unit displays a list of address information included in an address book that the driver manages and specifies the destination information that a user selects from the list to be the address information indicating a transmission destination of the document.

3. The information processing apparatus according to claim 1, wherein the specifying unit displays a list of address information included in an address book that the information processing apparatus has and specifies the destination information that a user selects from the list to be the address information indicating a transmission destination of the document.

4. The information processing apparatus according to claim 1, wherein the specifying unit specifies the destination information indicating a transmission destination of the document based on a property of the document designated by the designation unit.

5. The information processing apparatus according to claim 1, wherein the specifying unit obtains and displays a list of address information included in an address book that the device has and specifies the destination information that a user selects from the list to be the address information indicating a transmission destination of the document.

6. The information processing apparatus according to claim 1, wherein the communication mode includes any one of G3 and IP-FAX, and
wherein the control unit, in a case where the second determination unit determines that the driver does not support IP-FAX, causes the facsimile transmission to be performed by G3 if the communication mode designated in the destination information is G3, and causes the facsimile transmission not to be performed if the communication mode designated in the destination information is not G3.

7. The information processing apparatus according to claim 1, wherein the communication mode is IP-FAX, and
wherein the control unit causes the facsimile transmission to be performed in accordance with the communication mode designated in the destination information, in a case where the second determination unit determines that the driver supports IP-FAX.

8. The information processing apparatus according to claim 1, wherein, if the first determination unit determines that the communication mode is not designated in the destination information specified by the specifying unit, the control unit determines whether or not address information having the same address as the destination information exists in an address book other than the address book that the specifying unit uses for specifying the destination information, and in a case where there is the address information having the same address in another address book, causes the facsimile transmission to be performed in accordance with a communication mode of the address information having the same address.

9. The information processing apparatus according to claim 1, wherein the control unit controls to display that the facsimile transmission cannot be performed in a case where the first determination unit determines that the communication mode is designated in the destination information and the second determination unit determines that the driver does not support the designated communication mode.

10. A method of controlling an information processing apparatus capable of instructing a facsimile transmission by controlling a device capable of transmission of a facsimile, the method comprising:
designating a document which is a transmission target;
specifying destination information related to a transmission destination of the document designated in the designating;
determining whether or not a communication mode is designated in the destination information specified in the specifying;
determining whether or not a driver for causing the device to perform a facsimile transmission supports the communication mode; and
causing, (i) in a case where it is determined that the communication mode is designated in the destination information and that the driver supports the designated communication mode, the facsimile transmission to be performed in accordance with the designated communication mode,
(ii) in a case where it is determined that the communication mode is not designated in the destination information and that the driver supports a communication mode other than G3, displaying a screen via which a user selects a communication mode for performing the facsimile transmission, and
(iii) in a case where it is determined that the communication mode is not designated in the destination information and it is determined that the driver only supports G3, causing the facsimile transmission to be performed by G3.

11. The method according to claim 10, wherein the specifying includes causing a list of address information included in an address book that the driver manages to be displayed and specifying the destination information that a user selects from the list to be the address information indicating a transmission destination of the document.

12. The method according to claim 10, wherein the specifying includes causing a list of address information included in an address book that the information processing apparatus has to be displayed and specifying the destination information that a user selects from the list to be the address information indicating a transmission destination of the document.

13. The method according to claim 10, wherein the specifying includes specifying the destination information indicating a transmission destination of the document based on a property of the document designated in the designating.

14. The method according to claim 10, wherein the specifying includes obtaining and displaying a list of address information included in an address book that the device has and specifying the destination information that a user selects from the list to be the address information indicating a transmission destination of the document.

15. The method according to claim 10, wherein the communication mode includes any one of G3 and IP-FAX, and
wherein the controlling includes, in a case where it is determined that the driver does not support IP-FAX, causing the facsimile transmission to be performed by G3 if the communication mode designated in the destination information is G3, and causing the facsimile transmission not to be performed if the communication mode designated in the destination information is not G3.

16. The method according to claim 10, wherein the communication mode is IP-FAX, and wherein the controlling includes causing the facsimile transmission to be performed in accordance with the communication mode designated in the destination information, in a case where it is determined that the driver supports IP-FAX.

17. The method according to claim 10, wherein, if it is determined that the communication mode is not designated in the destination information specified in the specifying, the controlling includes determining whether or not address information having the same address as the destination information exists in an address book other than the address book that the specifying uses for specifying the destination information, and in a case where there is the address information having the same address in another address book, causing the facsimile transmission to be performed in accordance with a communication mode of the address information having the same address.

18. The method according to claim 10, further comprising causing to display that the facsimile transmission cannot be performed in a case where it is determined that the communication mode is designated in the destination information and it is determined that the driver does not support the designated communication mode.

19. A non-transitory computer-readable storage medium storing a program for causing a computer to function as an information processing apparatus capable of instructing a facsimile transmission by controlling a device capable of transmission of a facsimile, the apparatus comprising:

a designation unit configured to designate a document which is a transmission target;

a specifying unit configured to specify destination information related to a transmission destination of the document designated by the designation unit;

a first determination unit configured to determine whether or not a communication mode is designated in the destination information specified by the specifying unit;

a second determination unit configured to determine whether or not a driver for causing the device to perform a facsimile transmission supports the communication mode; and a control unit configured to:

(i) in a case where the first determination unit determines that the communication mode is designated in the destination information and the second determination unit determines that the driver supports the designated communication mode, cause the facsimile transmission to be performed in accordance with the designated communication mode, (ii) in a case where the first determination unit determines that the communication mode is not designated in the destination information and the second determination unit determines that the driver supports a communication mode other than G3, display a screen via which a user selects a communication mode for performing the facsimile transmission, and (iii) in a case where the first determination unit determines that the communication mode is not designated in the destination information and the second determination unit determines that the driver only supports G3, cause the facsimile transmission to be performed by G3.

* * * * *